United States Patent [19]

Landscheidt et al.

[11] Patent Number: 5,562,887
[45] Date of Patent: Oct. 8, 1996

[54] PURIFICATION OF ALKYL NITRITE-CONTAINING EXHAUST GASES

[75] Inventors: Heinz Landscheidt, Duisburg; Kaspar Hallenberger, Leverkusen; Paul Wagner, Düsseldorf; Alexander Klausener, Köln, all of Germany

[73] Assignee: Bayer Aktiengesellschaft, Leverkusen, Germany

[21] Appl. No.: 336,365

[22] Filed: Nov. 8, 1994

[30] Foreign Application Priority Data

Nov. 15, 1993 [DE] Germany ............ 43 38 982.1

[51] Int. Cl.⁶ ................................ C01B 21/00
[52] U.S. Cl. ............ 423/235; 423/245.2; 423/236; 558/488
[58] Field of Search .................. 423/235, 245.2, 423/236; 558/488

[56] References Cited

U.S. PATENT DOCUMENTS 4,879,401  11/1989  Doumaux, Jr. et al. ............ 558/488
5,167,935  12/1992  Lerner ............................ 422/172

FOREIGN PATENT DOCUMENTS 0090563  10/1983  European Pat. Off. .
2222123  10/1974  France .
2171688   9/1986  United Kingdom ............ 423/235

OTHER PUBLICATIONS

A. Hubert., et al., Chemical Abstracts, 82, abstract No. 144519s, abstract of FR 2,222,123 (1975).
M. Crookes, et al., J. Chem. Soc. Perkins Trans. II, pp. 1339–1343 (1988).
Perry, R. H. (ed) et al. *Perry's Chemical Engineers' Handbook 6th ed.* New York:Mc–Graw Hill Book Co, 1984, pp. 18–3 and 18–4.

*Primary Examiner*—Michael Lewis
*Assistant Examiner*—Amy M. Harding
*Attorney, Agent, or Firm*—Sprung Horn Kramer & Woods

[57] ABSTRACT

Alkyl nitrite-containing exhaust gases are purified in continuous form by treating them with equimolar to excess amidosulphuric acid in the form of an aqueous solution in the manner of a counter-current scrubbing at a temperature of 0°–100° C.

11 Claims, 2 Drawing Sheets

PURIFICATION OF ALKYL NITRITE-CONTAINING EXHAUST GASES

BACKGROUND OF THE INVENTION

1. Field of the Invention

The present invention relates to a method for the purification of alkyl nitrite-containing exhaust gases by treatment with amidosulphuric acid.

Alkyl nitrites (alkyl esters of nitrous acid), in particular the readily volatile lower alkyl nitrites, are used as reagents for oximations, nitrosations and diazotizations (Houben-Weyl Vol. 6/2 pp. 334–362).

Furthermore, a number of industrially interesting continuous methods are known in which the formation of alkyl nitrites, in particular methyl nitrite, proceeds in the gas phase within an overall process which is characterized in that alkyl nitrites, in particular methyl nitrite, function in the overall process as oxidants, cocatalysts, alkoxylation reagents or other reaction partners. It is typical of such processes that in their course the nitrogen monoxide formally contained in the alkyl nitrite is not consumed but is released as a gas. In a preferred embodiment of such reactions, the alkyl nitrite just generated is introduced into the reaction chamber or the reaction vessel together with the additional reaction partner or additional reaction partners and auxiliaries and the portion of the product gas stream which remains in the gaseous state and contains the nitrogen monoxide formed in the course of the reaction is returned to the reactor for the preparation of alkyl nitrite after separating off to the greatest possible extent the condensed or condensable reaction product or products. A cyclic process with respect to nitrogen monoxide and the particular alkyl nitrite is thus closed. The principle of such a process as exemplified by the use of methyl nitrite is depicted in FIG. 1. In detail, FIG. 1 shows a reactor I for the preparation of alkyl nitrite and a reactor II for a reaction consuming alkyl nitrite. The mass streams are 1=alkyl nitrite just formed, 2=other reaction partners for the reaction in II, 3=the reaction product formed in II and isolated by condensation and 4=the exhaust gas formed in the reaction in II and containing NO for return to I.

2. Description of the Related Art

Reactions in which such a continuously operated cyclic procedure is particularly advantageous are, for example, the following:

(A) The preparation of dimethyl oxalate from carbon monoxide and methyl nitrite in the presence of suitable catalysts (cf. EP 46 598)

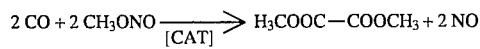

(B) The oxidation of unsubstituted or substituted olefins in the presence of methanol and suitable catalysts (cf. EP 55 108)

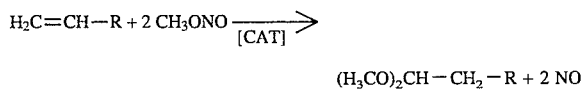

(C) The preparation of dimethyl carbonate from carbon monoxide and methyl nitrite in the presence of suitable catalysts (cf. EP 425 197)

If only an incomplete conversion is achieved when a low-boiling alkyl nitrite is used in the context of diazotizations, nitrosations or oximations, alkyl nitrite-containing exhaust gases occur.

Likewise, when alkyl nitrites are used as regenerable oxidizing agents, in particular in the case of the use of methyl nitrite mentioned by way of example in (A), (B) and (C) and reproduced diagrammatically in FIG. 1, it may be necessary to take off relatively small portions from the gas circulation to avoid enrichment of by-products.

The occurrence of uncontrolled reaction conditions in handling alkyl nitrites is also associated with the risk of the production of relatively large amounts of alkyl nitrite-containing exhaust gases.

For the industrial handling of alkyl nitrites in the context of the above described reactions it is therefore necessary, owing to the toxicity of the alkyl nitrites, to create apparatuses for the safe disposal of these alkyl nitrite-containing exhaust gases.

In JP 59/163 349 (CA 102 95248y), a method is described in which methyl nitrite is disposed of by introduction into an acidic hydrogen peroxide solution. This method is not industrially useable owing to the possible formation of explosive oxygen/methyl nitrite mixtures or other readily decomposable compounds.

To remove excess inorganic nitrites or nitrous acid from liquid reaction batches, the use of amidosulphuric acid has been proposed. Thus, for example, in DE 35 06 825, the purification of nitrite-containing wastewater by injection beneath the surface of excess aqueous amidosulphuric acid is described. As a result, the frequently observed formation of nitrous gases is to be suppressed.

However, there are no statements as to whether this method can be applied to the much more difficult—since it proceeds in heterogeneous reaction—removal of alkyl nitrites from gas streams and therefore there are also no statements on the industrial realizability of this possible method.

SUMMARY OF THE INVENTION

Surprisingly it has been found that the alkyl nitrite content in exhaust gases from the abovementioned reactions can be markedly decreased by treatment of this exhaust gas with aqueous amidosulphuric acid and using special equipment set-ups.

A continuous method has been found for the purification of alkyl nitrite-containing exhaust gases which is characterized in that these exhaust gases are treated with equimolar to excess amidosulphonic acid in the form of an aqueous solution in the manner of a counter-current scrubbing at a temperature of 0°–100° C. and the exhaust gas streams arising in this are subjected if necessary to a still further purification.

BRIEF DESCRIPTION OF THE DRAWINGS

The accompanying drawings (FIGS. 1–4) show the combination of the inventive purification process with an alkyl nitrite-consuming process (FIG. 1, discussed above) and exemplary process units to carry out the inventive process (FIGS. 2–4, discussed below).

DETAILED DESCRIPTION OF THE INVENTION

In this, according to the reaction equation (1)

(1) RONO+NH$_2$SO$_3$H→ROH+N$_2$+H$_2$SO$_4$ the underlying alcohol, nitrogen and sulphuric acid are formed, that is substances the disposal of which is without problem.

The amidosulphuric acid used in the method according to the invention is a readily available and safely handleable compound. It can be prepared, for example, from ammonia and sulphur trioxide (Ullmann, Vol. 22, pp. 311–313). Amidosulphuric acid is used industrially to a great extent, for example for the removal of limescale or in fire extinguishing compositions to release carbon dioxide from carbonates.

The exhaust gas to be purified may if desired contain, in addition to the alkyl nitrite, inert or carrier gases, such as for example carbon dioxide, argon or nitrogen, and still further substances which are gaseous under the given conditions (pressure, temperature, partial vapour pressure), which originate, for example, from the upstream reaction producing the exhaust gas. These substances can be, for example, solvents, residues of unreacted reaction feedstocks, unisolated or volatile portions of the reaction products or gaseous by-products.

Figure 1:
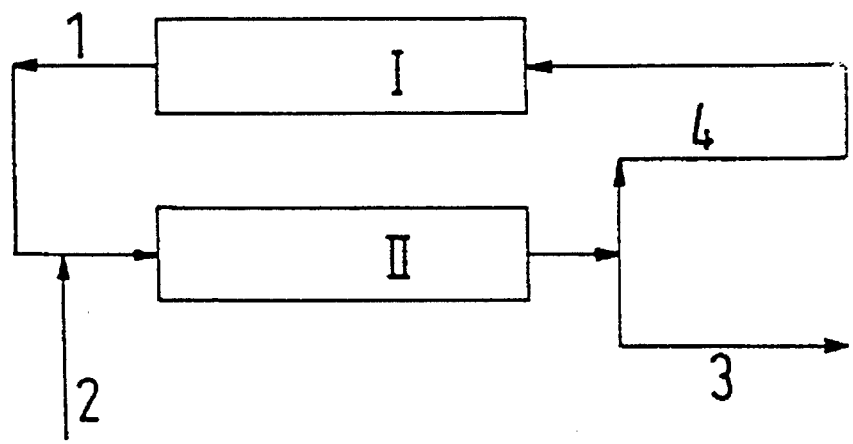

In particular, the exhaust gases which occur in the oxidation methods preferably carried out with the use of methyl nitrite, which have been mentioned in examples (A), (B) and (C) and which are diagrammatically reproduced in FIG. 1 and which generally contain residues of nitrogen monoxide, carbon monoxide or methanol can be purified with the aid of the method according to the invention without undesired side-reactions occurring.

Figure 2:
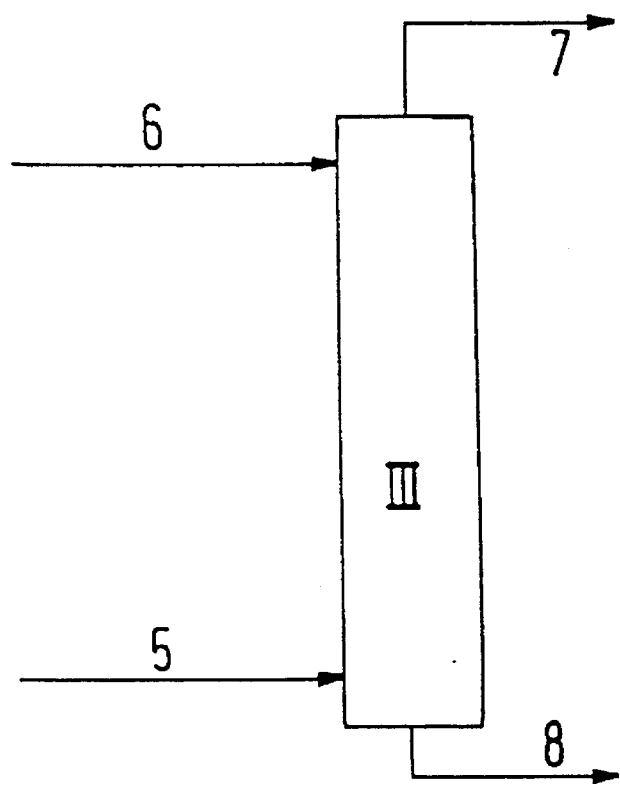
Figure 3:
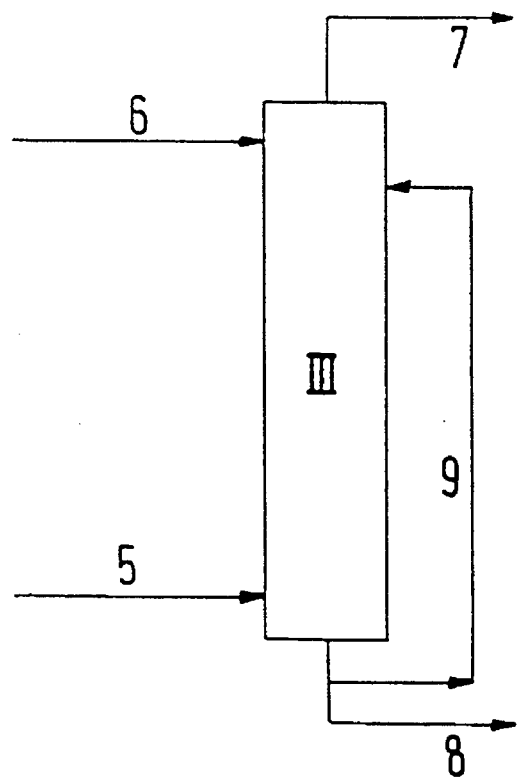
Figure 4:
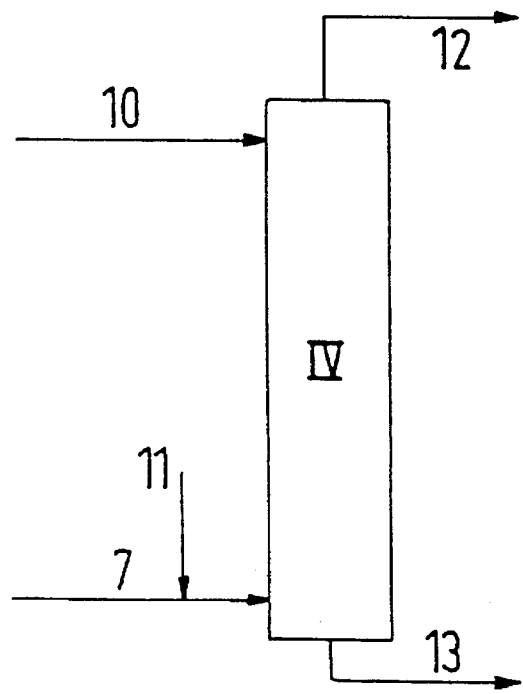

Certain residues contained in the exhaust gas to be purified, such as for example nitrogen monoxide or carbon monoxide, are not separated off in the simple embodiment of the method according to the invention and are therefore discharged via the gas phase. However, in a particular embodiment of the method according to the invention, the separation of nitrogen oxides, which is significant from industrial and ecological viewpoints, is if appropriate also carried out, more precisely by a further exhaust gas treatment. This is preferably achieved through the fact that a suitable equipment set-up, as is represented diagrammatically, for example, in FIG. 4, is charged with the exhaust gases which leave the equipment set-ups diagrammatically represented in FIG. 2 or FIG. 3, preferably with additional feed of oxygen or oxygen-containing gas mixtures, preferably air. This additional feed of oxygen or oxygen-containing gas mixtures can be made into the equipment set-up depicted in FIG. 4 or into the exhaust gas streams leaving FIG. 2 and FIG. 3. FIG. 2, FIG. 3 and FIG. 4 are described in more detail further below.

Other residues contained in the exhaust gas to be purified, such as for example alcohols which are low-boiling and present according to their partial vapour pressure, such as in particular methanol, are likewise removed from the exhaust gas by the method according to the invention. The presence of such residues does not impair the efficiency of the method according to the invention and thus does not impair the efficiency of the exhaust gas purification.

The exhaust gases, before purification, can be diluted if appropriate with inert gases such as carbon dioxide or nitrogen.

Alkyl in the context of the invention is $C_1$–$C_4$-alkyl, for example methyl, ethyl, propyl, isopropyl, butyl, sec-butyl, isobutyl and tert-butyl.

The exhaust gas to be purified by the method according to the invention can contain 0.1 to 45% by volume of alkyl nitrite.

In the method, the molar ratio of added amidosulphuric acid to the alkyl nitrite is 1:1 to 10:1, preferably 1:1 to 4:1.

The amidosulfuric acid is used as aqueous solution in a concentration of 1–20% by weight, preferably 10–15% by weight.

The purification according to the invention of alkyl nitrite-containing exhaust gases is carried out in the manner of a counter-current scrubbing.

To carry out the method according to the invention, reaction columns preferably designed as single-stage or multi-stage scrubbers are used which ensure a large phase interface (gaseous/liquid) and an intimate mixing of the liquid and gaseous phases.

This can be achieved by the installation of plates, such as bubble-cap plates, perforated plates, valve plates, slotted plates etc., as are conventional in thermal separation operations, or by equipping the column with dumped packings of all types, with arranged packings made of metal, ceramics, plastics, glass or with other materials which are inert with respect to the reaction partners of the method according to the invention.

Such columns containing internals, dumped-type packings or arranged-type packings and the dumped-type packings and arranged-type packings themselves are commercially available and known to those skilled in the art.

In their construction, the residence time behaviour of gas and liquids is matched to the reaction rate and the expected alkyl nitrite content in the exhaust gases to be purified.

In FIG. 2 a diagrammatic representation of the method according to the invention is given. The alkyl nitrite-containing gas mixture 5 is delivered at the bottom of column III and ascends within this column. In counter-current thereto moves an aqueous amidosulphuric acid solution 6 delivered at the head of the column.

The liquid 8 taken off at the bottom contains, in addition to unreacted amidosulphuric acid, the reaction products of the reaction proceeding according to reaction equation (1) which are discharged in the liquid state under the reaction conditions, that is sulphuric acid and the underlying alcohol, and further components contained in the gas mixture to be purified which are scrubbed out under the reaction conditions. The liquid can if appropriate be subjected to further downstream treatment steps such as for example a neutralization or a concentration. 7 is the exhaust gas substantially freed of alkyl nitrite. The substantially freed exhaust gas has a residual content of alkyl nitrite of 0.001 to 5% of the initial value, preferably 0.001 to 2%, particularly preferably 0.001 to 0.5%.

It is likewise possible, as shown in FIG. 3, to return a part 9 of the liquid arising at the bottom to a part of such a reaction column III situated above the take-off. The returned solution can in this case, if appropriate, be enriched by admixing of fresh amidosulphonic acid. The further designations correspond to those of FIG. 2.

The temperature within such a reaction column can be established if necessary via additionally mounted cooling or heating units which are preferably mounted in the circulation stream above the lower part of the two-stage or multi-stage design scrubber. If necessary, a condenser can be mounted at the top of the column.

The method is carried out in a temperature range of 0°–100° C., preferably 10°–80° C., particularly preferably 20°–60° C.

The pressure at which the method according to the invention is carried out is 0.1–50 bar, preferably 0.5–10 bar.

For the special embodiment of the method according to the invention in which any nitrogen oxides still remaining in the exhaust gas, in particular nitrogen monoxide, are eliminated by a further exhaust gas treatment step, the same equipment set-ups and internals as the equipment set-ups and internals described above for the removal of alkyl nitrites from process exhaust gases are useful for this exhaust gas treatment step and consequently preferably as reaction columns designed as single-stage or multi-stage scrubbers and preferably as reaction columns furnished with internals.

In FIG. 4, a diagrammatic representation is given of this part-step of the said special embodiment of the method according to the invention. The nitrogen oxide-, in particular nitrogen monoxide-containing gas mixture 7, as can arise in FIG. 2 or FIG. 3, is preferably delivered at the bottom of column IV with additional feed of oxygen or oxygen-containing mixture (mass stream 11) and ascends within this column. In counter-current thereto moves water or an aqueous solution of an inorganic base, such as for example aqueous sodium hydroxide solution, aqueous potassium hydroxide solution, aqueous ammonia solution or aqueous calcium hydroxide solution (mass stream 10), delivered at the top of the column. The additional feed of oxygen or oxygen-containing gas mixture, preferably air, can proceed separately into the lower part of the reaction column depicted in FIG. 4 or into the prepurified gas stream (cf. FIG. 4) brought about in the upstream equipment set-up depicted in FIG. 2 or FIG. 3.

If water is delivered to the top of the column, the amount is from 10 to 200 equivalents, preferably from 20 to 150 equivalents, based on the equivalents of N present per unit of time in the form of nitrogen oxides.

Otherwise, per unit of time, the inorganic base is used in an amount of 1–5 equivalents, preferably 1.1–4 equivalents, based on the equivalents of N present per unit of time in the form of nitrogen oxides. The concentration of the inorganic base is 1–40% by weight, preferably 5–25% by weight, based on the total aqueous solution of the base. The preferred additional feed of $O_2$ or air only need be used if the composition of the nitrogen oxides does not permit their conversion into nitrous acid or nitric acid or the salts thereof, for example always when there is an excess of NO. The amount of oxygen in such cases is 100–500%, preferably 150–400%, of that which is required in order to convert the nitrogen oxides into nitrous acid or the salts thereof. In this case, in addition to the nitrous acid nitric acid (if appropriate as salt) also occurs.

The liquid 13 taken off at the bottom contains, in addition to excess water or excess aqueous solution of the inorganic base used, the dissolved reaction products of the nitrogen oxides taken off from the gas stream, prefably the nitrogen monoxide taken off from the gas stream, consequently nitric acid and nitrous acid or the salts of the nitric acid and nitrous acid derived from the inorganic base used. It is likewise possible, similarly to the principle reflected in FIG. 3, to return a part of the liquid arising at the bottom to a part of such a reaction column situated above the take-off. The returned solution in this case can if appropriate be enriched by admixing fresh inorganic base.

The temperature within such a reaction column can if necessary be adjusted via additionally mounted cooling or heating units which are preferably mounted in the circulation stream above the lower part of the two-stage or multi-stage design scrubber. A condenser can be mounted if required at the top of the column.

The exhaust gas treatment step combined in this manner with the removal of alkyl nitrites is carried out in a temperature range of 0°–100° C., preferably 10°–80° C., particularly preferably 20°–60° C.

The pressure at which the exhaust gas treatment step downstream of the removal of alkyl nitrites is carried out is 0.1–50 bar, preferably 0.5–10 bar. In a further variant of the removal of nitrogen oxides, this step can be combined with the removal of the alkyl nitrites and can then be carried out in only one column for both steps. For this purpose, the alkyl nitrite-containing and nitrogen oxide-containing exhaust gas is introduced with prior feed of air or oxygen into the first column described above and treated with the aqueous amidosulphonic acid solution. Temperature, pressure, quantity of $O_2$ and quantity of $H_2O$ in accordance with the above statements. In this case a bottom efflux is obtained from the column which, in addition to the alkanol and excess amidosulphonic acid, further contains nitric acid, nitrous acid or both.

The method according to the invention is used, for example, for the purification of exhaust gases from oximations, diazotizations or nitrosations which have been carried out in the presence of or with the use of alkyl nitrite, preferably methyl nitrite. It is further used with exhaust gases from the preparation of dialkyl carbonates or dialkyloxalates by oxidation of carbon monoxide by alkyl nitrites, preferably by methyl nitrite. Finally, it is applied to exhaust gases which originate from the oxidation of olefins in the presence of alkyl nitrite, preferably methyl nitrite.

EXAMPLES

Example 1

Into the lower part (beneath the lowest plate) of a glass column containing 20 actual plates was introduced, at a pressure of 1 bar and a temperature of 25° C., a volumetric flow, constant over time, of 500 l/h of a gas mixture which had a methyl nitrite content of 15% by volume.

At the top of the column, at the same time, a stream, constant over time, of 20 l/h of a 15% strength aqueous amidosulphonic acid solution was fed in.

The exhaust gas leaving the column only contained 0.005% by volume of methyl nitrite.

Example 2

Into the lower part (beneath the bottom plate) of a glass column containing 20 actual plates, at a pressure of 1 bar and a temperature of 25° C. a volumetric flow, constant over time, of 100 l/h of a gas mixture was introduced which had a methyl nitrite content of 45% by volume.

At the top of the column, at the same time, a stream, constant over time, of 2 l/h of a 15% strength aqueous amidosulphonic acid solution was fed in.

The exhaust gas leaving the column only contained 0.002% by volume of methyl nitrite.

Example 3

Into the lower part (beneath the lowest plate) of a glass column containing 30 actual plates, at a pressure of 1 bar and a temperature of 25° C. a volumetric flow, constant over time, of 500 l/h of a gas mixture was introduced which had a methyl nitrite content of 1.5% by volume.

At the top of the column, at the same time, a stream, constant over time, of 4 l/h of a 15% strength aqueous amidosulphonic acid solution was fed in.

The exhaust gas leaving the column only contained 0.005% by volume of methyl nitrite.

Example 4

Into the lower part (beneath the lowest plate) of a glass column containing 20 actual plates, at a pressure of 1 bar and a temperature of 25° C. a volumetric flow, constant over time, of 500 l/h of a gas mixture was introduced which had a methyl nitrite content of 15% and a nitrogen monoxide content of 15%.

At the top of the column, at the same time, a stream, constant over time, of 20 l/h of a 15% strength aqueous amidosulphonic acid solution was fed in.

The exhaust gas leaving the column was mixed with an oxygen stream of 50 l/h and introduced into the lower part of a second glass column.

At the top of this column, at the same time, a stream, constant over time, of 4 l/h of a 10% strength sodium hydroxide solution was fed in.

In the exhaust gas leaving the column, no methyl nitrite and no nitrogen oxides could be detected any longer.

What is claimed is:

1. A continuous method for the purification of exhaust gases containing 0.1 to 45% by volume methyl nitrite, wherein said exhaust gases are treated with a scrubbing solution consisting essentially of amidosulphuric acid in the form of an aqueous solution in the manner of a counter-current scrubbing at a temperature of 0°–100° C., a pressure of 0.5–10 bar and at a molar ratio of amidosulphuric acid to methyl nitrite of from 1:1 to 10:1, whereby the methyl nitrite content of said gases is reduced to 0.001–5% of the initial amount.

2. The method of claim 1, wherein the treatment is carried out at a temperature of 10°–80° C.

3. The method of claim 2, wherein the treatment is carried out at a temperature of 20°–60° C.

4. The method of claim 1, wherein the treatment is carried out at a pressure of 0.5–10 bar.

5. The method of claim 1, wherein the molar ratio of added amidosulphuric acid to the alkyl nitrite is 1:1 to 4:1.

6. The method of claim 1, wherein the treatment with amidosulphonic acid and the further purification are carried out in only one column and for this purpose oxygen or oxygen-containing gas is fed to the exhaust gas to be purified prior to entry into the single counter-current scrubbing in the vicinity of the exhaust gas entry simultaneously with the exhaust gas.

7. A continuous method for the purification of exhaust gases containing 0.1 to 45% by volume methyl nitrite comprising scrubbing said gases with a scrubbing solution consisting essentially of an aqueous solution of amidosulphuric acid having a concentration of from 1–20% by weight, in a counter-current scrubber at a temperature of 0°–100° C. and a pressure of 0.5 to 10 bar, whereby the methyl nitrite concentration of said gases is reduced to 0.001–5% of the initial amount, and then further treating said exhaust gases by a scrubbing with either water or aqueous inorganic bases, in the presence of oxygen, to react with residual nitrogen oxides.

8. The method of claim 7, wherein the residual nitrogen oxide is nitrogen monoxide.

9. The method of claim 7, wherein the further exhaust gas treatment is carried out in the form of a counter-current scrubbing.

10. The method of claim 7, wherein the exhaust gas stream provided for the further exhaust gas treatment and/or the equipment set-up provided for the further exhaust gas treatment is additionally fed with oxygen or oxygen-containing gas mixtures.

11. The method of claim 10, wherein the oxygen-containing gas mixture is air.

* * * * *

UNITED STATES PATENT AND TRADEMARK OFFICE
CERTIFICATE OF CORRECTION

PATENT NO. : 5,562,887
DATED : October 8, 1996
INVENTOR(S) : Landscheidt, et al.

It is certified that error appears in the above-indentified patent and that said Letters Patent is hereby corrected as shown below:

Title Page    FOREIGN PATENT DOCUMENTS: Insert -- 3506825, 8/1986, Germany --

Title Page    OTHER PUBLICATIONS: Insert -- Chemical Abstracts, Vol. 105, 1986, page 340; CA# 158322c: " Detoxification of nitrite-containing wastewater", K.H. Knirsch.
Chemical Abstracts, Vol. 102, 1985, page 538; CA# 95248y: " Removal of Alkyl nitrites", Kokai Tokkyo Koho, Nippon Peroxide Co. --

Signed and Sealed this

Eighteenth Day of March, 1997

Attest:

BRUCE LEHMAN

Attesting Officer     Commissioner of Patents and Trademarks